UNITED STATES PATENT OFFICE.

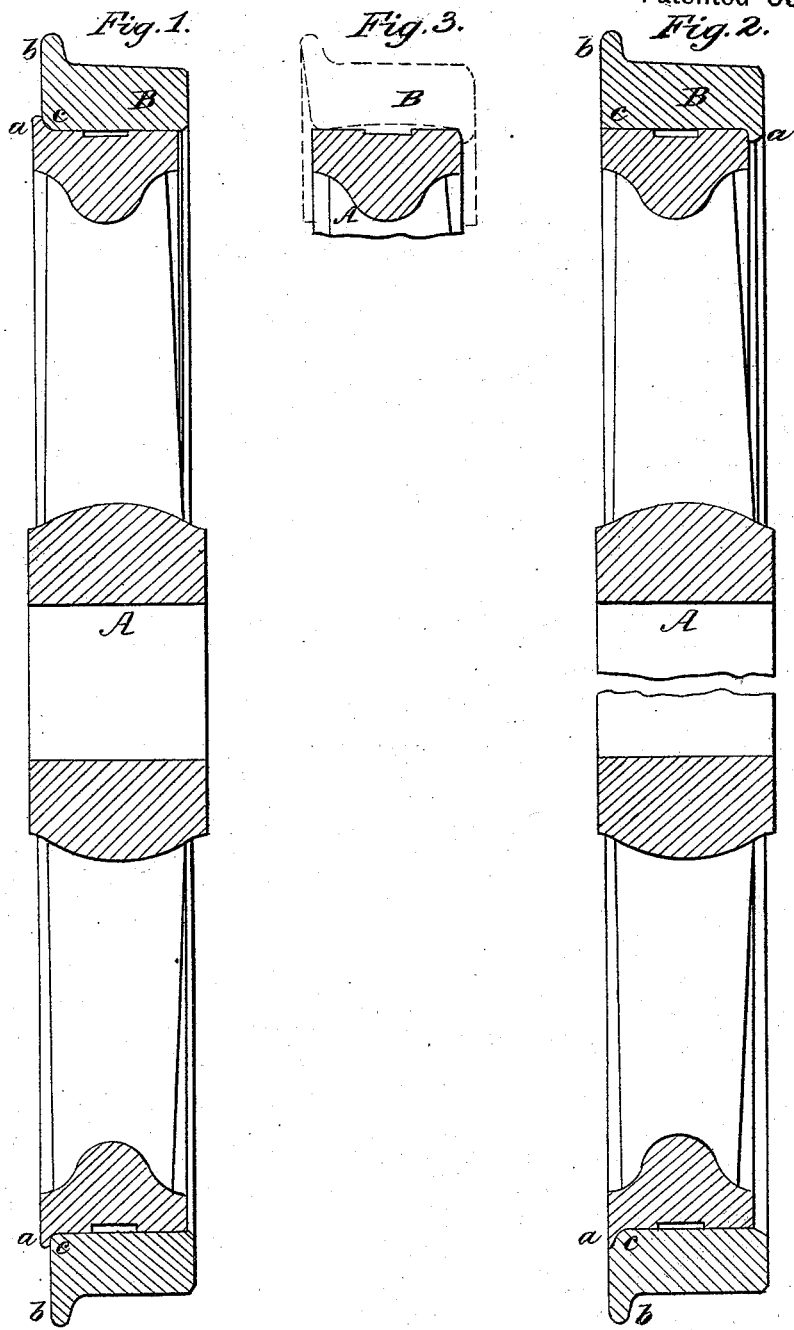

EDWARD MELLON, OF SCRANTON, PENNSYLVANIA.

IMPROVED MODE OF ATTACHING TIRES TO WHEELS OF LOCOMOTIVES.

Specification forming part of Letters Patent No. 58,447, dated October 2, 1866.

*To all whom it may concern:*

Be it known that I, EDWARD MELLON, of Scranton, in the county of Luzerne and State of Pennsylvania, have invented a new and useful Improvement in Applying Tires to Locomotive-Wheels; and I do hereby declare that the following is a full, clear, and exact description thereof, which will enable others skilled in the art to make and use the same, reference being had to the accompanying drawings, forming part of this specification, in which—

Figures 1 and 2 are central sections of a locomotive-wheel having a tire applied to it according to my invention; Fig. 3, a section of a portion of a locomotive-wheel having its tire affected by wear, drawn with a view of showing the advantage of one feature of my invention.

Similar letters of reference indicate like parts.

This invention has for its object the securing of tires on the wheels of locomotives without the aid of bolts, and in such a manner that the tire, in case of becoming loose, cannot casually slip off from the wheel.

The invention consists in having the wheel, or the tire which is to be fitted on the same, provided with a single flange, arranged in such a manner that said flange, in connection with the usual flange on the tire, will keep the latter on the wheel.

The invention also consists in constructing the tire with a rounded edge at one side of its inner surface, in order to prevent said edge from indenting and sinking into the periphery of the wheel, a contingency which would otherwise occur in consequence of the tire becoming stretched by use.

A represents a locomotive-wheel, which may be constructed in the usual or any proper manner, and B is the tire fitted thereon. The periphery of the wheel A is provided at the inner edge with a flange, $a$, as shown in Figs. 1 and 2.

The tire B is shrunk on the periphery of the wheel A as usual, and it will be seen that the flange $a$ prevents the tire, should it become loose on the wheel A, from slipping off at the inner side of the wheel, and the flange $b$ of the tire will, of course, prevent the latter from slipping off at the outer side of the wheel.

By this arrangement no bolts or set-screws are required to aid in fastening the tire on the wheel, for it is impossible for the tire to leave the wheel either at the right or left side thereof.

The same result may be attained by having the inner surface of the tire, at its outer edge, provided with a flange, $a'$, as shown at the upper part of Fig. 2.

The inner surface of the tire, at its inner edge, is rounded, as shown at $c$ in all the figures, in order to prevent said edge from indenting or sinking into the periphery of the wheel.

The tires of locomotive wheels are, under the jars, concussions, and wear to which they are subjected, considerably stretched, and they invariably become concave at their inner surface, (see Fig. 3,) the edges spreading over the sides of the wheel, and forming a lock in some cases, so as to render the cutting of the tire necessary in order to detach it from the wheel.

With my improvement the flange $a$ would cause the inner edge of the inner surface of the tire to indent the periphery of the wheel or form a crease in it if the edge $c$ were not rounded.

The great feature in this invention is that I retain the tire on the wheel without the employment of bolts, rivets, keys, or other like attachments. I heat my tire until it has expanded sufficiently to be slipped over the periphery of the wheel. It then cools and contracts and holds or binds the wheel firmly.

After the wheel, as completed, has been in use a certain length of time, the tire will stretch and thus become loose on the wheel, then the pressure of the resistance against the rail will bear or force the tire inward against the flange $a$ of the wheel.

Now, it is not intended to run the engine unnecessarily with a loose tire; but should this tire become loose while on the road, there is sufficient safety in running the engine until the depot is reached or until it will be convenient to repair or replace it by a new one.

The tire can be readily slipped off, there being no rivets or other fastenings to undo, and the convenience and utility of my improvement are apparent.

I am aware of the invention described in patent to N. Hodge, November 18, 1851; but I wish it to be understood that I do not claim the invention therein described—viz., the angular flange upon the inner edge of the wheel and the flange upon the outer edge of the wheel; but I do claim as my invention—

The wheel, with the curved flange upon the inner edge, in combination with a tire with a rounded corner to fit said curved flange, as set forth.

The above specification of my invention signed by me this 9th day of September, 1865.

EDWARD MELLON.

Witnesses:
M. M. LIVINGSTON,
C. L. TOPLIFF.